(12) United States Patent  (10) Patent No.: US 7,552,875 B2
Slatter et al.  (45) Date of Patent: Jun. 30, 2009

(54) PRINT MEDIA WITH ATTACHED DATA STORAGE AND METHOD OF STORING DATA THEREON

(75) Inventors: David Neil Slatter, Bristol (GB); James Thomas Edward McDonnell, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 96 days.

(21) Appl. No.: 10/565,368

(22) PCT Filed: Jul. 22, 2004

(86) PCT No.: PCT/GB2004/003171

§ 371 (c)(1), (2), (4) Date: Jun. 21, 2006

(87) PCT Pub. No.: WO2005/013192

PCT Pub. Date: Feb. 10, 2005

(65) Prior Publication Data

US 2007/0109389 A1  May 17, 2007

(30) Foreign Application Priority Data

Jul. 24, 2003  (GB)  ................................. 0317311.9

(51) Int. Cl.
*G06K 19/00* (2006.01)
(52) U.S. Cl. ...................................................... 235/487
(58) Field of Classification Search .................. 235/492, 235/487
See application file for complete search history.

(56) References Cited

U.S. PATENT DOCUMENTS

| 5,440,401 | A | * | 8/1995 | Parulski et al. .............. 386/124 |
| 5,574,519 | A | * | 11/1996 | Manico et al. .............. 396/429 |
| 5,706,097 | A | * | 1/1998 | Schelling et al. ............ 358/296 |
| 5,799,219 | A | * | 8/1998 | Moghadam et al. ......... 396/319 |
| 5,845,160 | A | * | 12/1998 | Patton ........................ 396/312 |
| 5,978,551 | A | * | 11/1999 | Koyama ..................... 358/1.2 |
| 6,123,362 | A | * | 9/2000 | Squilla et al. ................. 283/67 |
| 6,363,239 | B1 | * | 3/2002 | Tutt et al. ................... 434/317 |
| 6,381,418 | B1 | * | 4/2002 | Spurr et al. ................. 396/310 |
| 6,456,391 | B1 | * | 9/2002 | Miyamoto et al. ......... 358/1.18 |
| 6,623,528 | B1 | * | 9/2003 | Squilla et al. .............. 715/202 |
| 6,674,923 | B1 | * | 1/2004 | Shih et al. .................. 382/305 |
| 2001/0009454 | A1 | * | 7/2001 | Manico et al. ................ 355/41 |
| 2002/0170973 | A1 | | 11/2002 | Teraura |
| 2003/0227550 | A1 | * | 12/2003 | Manico et al. ......... 348/207.99 |
| 2004/0100363 | A1 | * | 5/2004 | Lane et al. ................. 340/5.86 |

FOREIGN PATENT DOCUMENTS

| EP | 0 878 732 A | 11/1998 |
| JP | 2001-088389 A | 4/2001 |
| JP | 2002-120475 A | 4/2002 |

* cited by examiner

*Primary Examiner*—Daniel A Hess
*Assistant Examiner*—Paultep Savusdiphol

(57) ABSTRACT

A print has a substrate and a plurality of memory tags coupled to the substrate. The print is an index print including a plurality of images and a memory tag is associated with each image for storage of data relating to that image. A print medium suitable for forming such a print has a substrate with a printable surface and a plurality of memory tags coupled thereto at locations spaced apart over the area of the substrate. Alternatively, memory tags may be applied to a printed print medium. Methods of providing printed images with associated stored data are described.

18 Claims, 4 Drawing Sheets

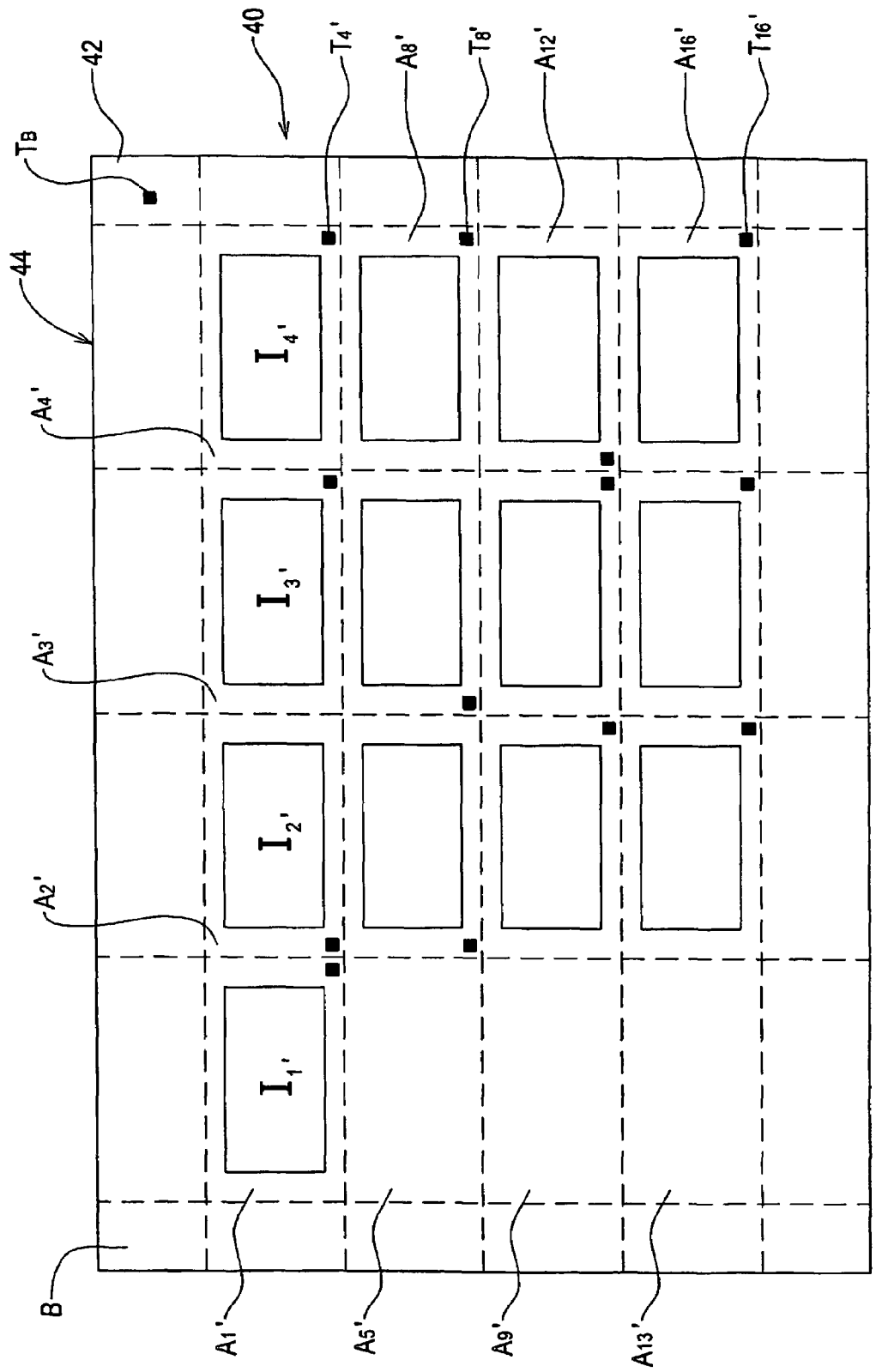

PRINT MEDIA WITH ATTACHED DATA STORAGE AND METHOD OF STORING DATA THEREON

This application is a national stage of PCT/GB2004/003171 filed Jul. 22, 2004, which is based on Great Britain Application No. 0317311.9 filed Jul. 24, 2003, both of which are incorporated herein by reference in their entirety.

FIELD OF THE INVENTION

The invention relates to a print of a plurality of images having attached data storage associated with each image. It also relates to the provision of a print medium for such prints, and a method of recording data relating to a plurality of images thereon. The invention is particularly advantageous for use with photographic images but is not limited to such use.

BACKGROUND OF THE INVENTION

Prior to the advent of digital photography most photographic images were stored as negatives and/or as image prints. To assist in maintaining a library of images index prints, comprising a small print of each photograph from a film on a single sheet, were often produced. With the advent of digital photography, and the ability to scan photographs and store them electronically even if taken using traditional methods, the storage options have increased dramatically.

In many cases whole libraries of photographs are simply stored on the hard discs of computers, whilst in other cases they are stored on removable storage media, such as floppy discs or CDs. However, this often means a very large number of the removable storage media, particularly when floppy discs are used and, when a user wishes to locate a particular image and print a copy of it, finding it can be problem. If there is a collection of index prints relating to the library which provides the location of the stored image file then at least it is simply a question of going to the correct location and printing the image. However, in many cases image prints have not been made and the user has to look through the stored images (most conveniently using appropriate software to run a slide show of them) to identify which one is required.

One approach that has been described for use with recorded digital images is to provide an index sheet which includes thumbnails of the images and associated selection fields. Manual mark up of the selection fields is followed by scanning of the marked up index sheet to trigger an appropriate action (printing, storage, retrieval etc.) of the associated thumbnail. The index sheet is hence an interface to enable effective access to electronic data stored elsewhere.

It would be desirable to provide an alternative way to store and select images, such as photographic images, which was better adapted to a range of user requirements.

SUMMARY OF THE INVENTION

According to a first aspect of the invention there is provided a print having a substrate and a plurality of memory tags coupled to the substrate, wherein the print is an index print including a plurality of images and a memory tag is associated with at least some of the images for storage of data relating to that image.

A memory tag may broadly be described as a passive electronic memory in a form factor which allows it to be readily placed on or associated with a physical item, such as a sheet of paper. One form of memory tag is a Radio Frequency Identification (RFID) tags. RFID tags come in many forms but all comprise an integrated circuit including a memory, in which in use information can be stored, and a coil which enables the circuit to be interrogated by a reader which also powers it by means of an inductive (wireless) link. Memory tags which are of this general type are particularly suitable for implementation of the present invention, but it should be noted that other forms of memory tag could also be employed (such as tags which comprise a conventional memory circuit, a circuit being made when contact points for the memory circuit are placed in contact with a user reader to complete and power the circuit).

For each image in respect of which data is stored, the image may be printed with low resolution and the data relating to the image may include the image in high resolution.

For each image in respect of which data is stored, the data relating to the image may include information about the initial creation of the image and/or about the content of the image.

For each image in respect of which data is stored, the memory tag associated with the image is preferably located on the substrate adjacent to the respective image.

Conveniently the substrate is divided into a plurality of image areas each of which has printed thereon a single image and is provided with an associated memory tag. Each memory tag may be located in the same place in the respective image area or may be located in the same place with respect to the respective image.

The print may further include a further memory tag for storage of data relating to all of the images on the print.

Preferably the print includes an icon at the location of each memory tag.

According to a second aspect of the invention there is provided a print medium with associated data storage, the print medium including a substrate with a printable surface and a plurality of memory tags coupled thereto at locations spaced apart over the area of the substrate.

It is preferable that the memory tags are inductively powered to have data written to them.

The substrate is preferably divided into a plurality of image areas and a memory tag may be located in each image area.

The image areas may form a regular grid with each memory tag located in the same place with respect to the image area in which it is located. Alternatively the image areas may form a regular grid with the memory tags located in different locations within the image areas.

According to a third aspect of the invention there is provided a method of storing data concerning a plurality of images, on a print storage medium including a substrate and a plurality of memory tags coupled thereto at locations spaced apart over the area of the substrate, the method comprising the steps of:

printing a plurality of visible images onto the substrate, each one adjacent to a memory tag;

for at least some images storing data associated with the respective image in the memory tag adjacent to it.

According to a fourth aspect of the invention there is provided a method of storing data concerning a plurality of images comprising the steps of:

printing a plurality of visible images onto a substrate;

applying a memory tag to the substrate adjacent to each image, and for each image adjacent to which a memory tag has been applied, storing data associated with the image in the memory tag adjacent to it.

The memory tags may be applied to the substrate before the data is stored in them or the data may be stored in the memory tags before they are applied to the substrate.

BRIEF DESCRIPTION OF THE DRAWINGS

Examples of the invention will now be described, by way of example only, with reference to the accompanying drawings in which.

DETAILED DESCRIPTION OF THE PREFERRED EMBODIMENTS

Figure 1:
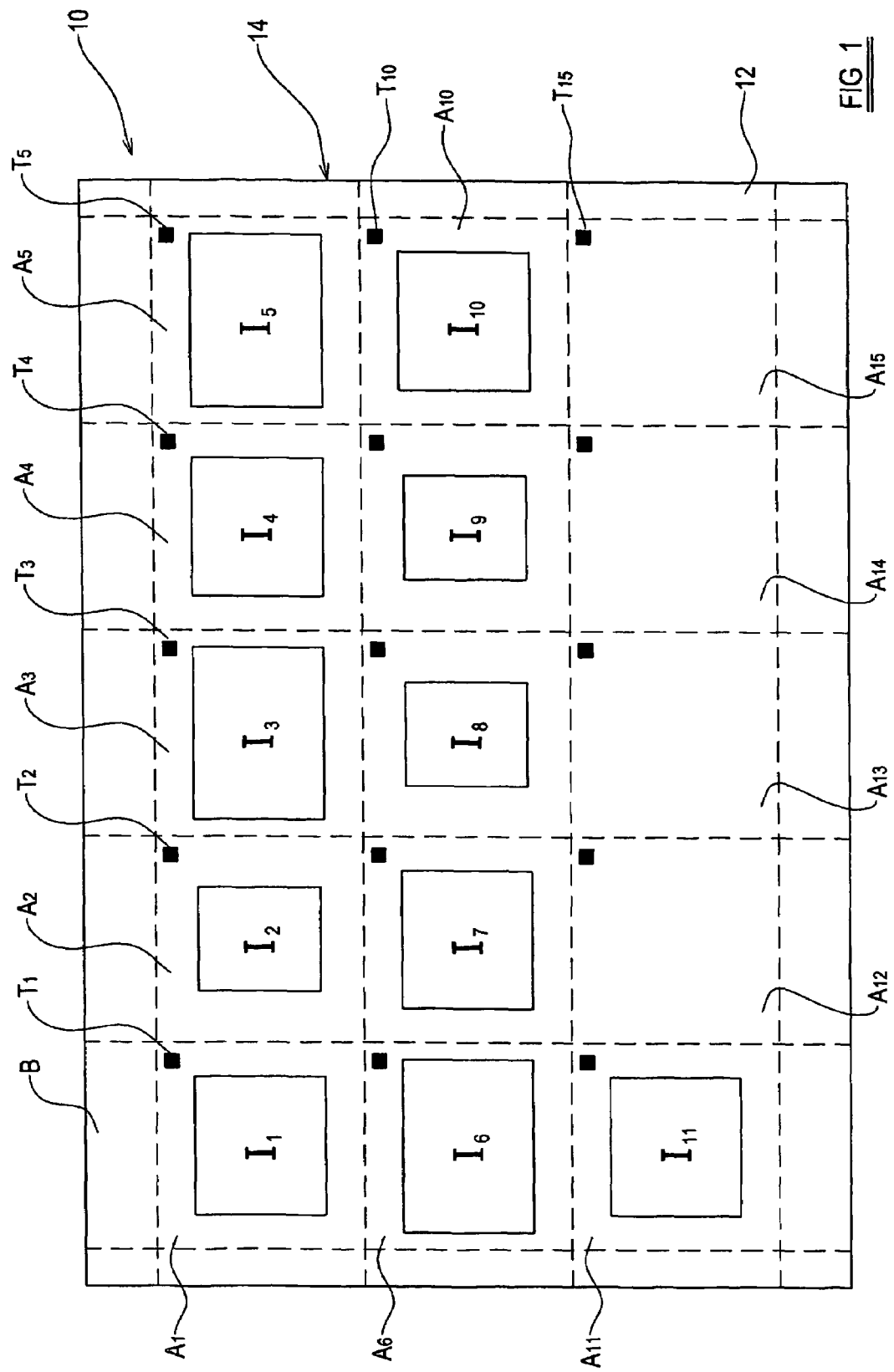
FIG. 1 schematically illustrates a first embodiment of a print according to the invention.

Referring to FIG. 1, a print 10 comprising a plurality of images I on a substrate 12 is schematically illustrated. The area of the substrate 12 is nominally divided up into images areas A and a border B as illustrated by the chain lines. Each image area A can have an image I printed in it, and in this case areas $A_1$ to $A_{11}$ have images $I_1$ to $I_{11}$ respectively and areas $A_{12}$ to $A_{15}$ do not have images printed in them and are left blank. The images I are not of a particular size or relative dimensions, but rather vary as desired; they could however all be of the same size. Each area A has located within it, and coupled to the substrate 12, in this case top right of each area A, a memory Tag T. The memory tags T thus form a regular array on the substrate 12.

As indicated above, a variety of memory tag technologies could be employed in different embodiments of the invention. However, a preferred form of memory tag—inductively powered but with a much larger memory than conventional RFID, and suitable for near-contact reading—will be described in preferred embodiments below.

The print 10 is intended as an index print of the images I. The images I are printed onto the substrate 12 in low resolution and data relating to each image I is stored in the corresponding memory tag T. The data preferably includes the image in high resolution format, and may further include data concerning the image such as the camera settings, light levels etc. from when it was formed and information such as where it was taken, what it is of and so on, although any data chosen may be stored in the memory tags T.

The substrate 12 and memory tags T combined form a print medium 14 with associated data storage, i.e. a physical storage medium specifically adapted for the storage of data relating to a plurality of images both in visible printed form and in digital form.

It is also possible of course that some, or indeed all, of the images may be printed onto the substrate 12 without data being written to the associated memory tag T. For example it may be, with regard to FIG. 1, that $I_{10}$ is simply printed into area $A_{10}$ of the substrate 12 with no data having been stored in the associated memory tag $T_{10}$.

Figure 2:
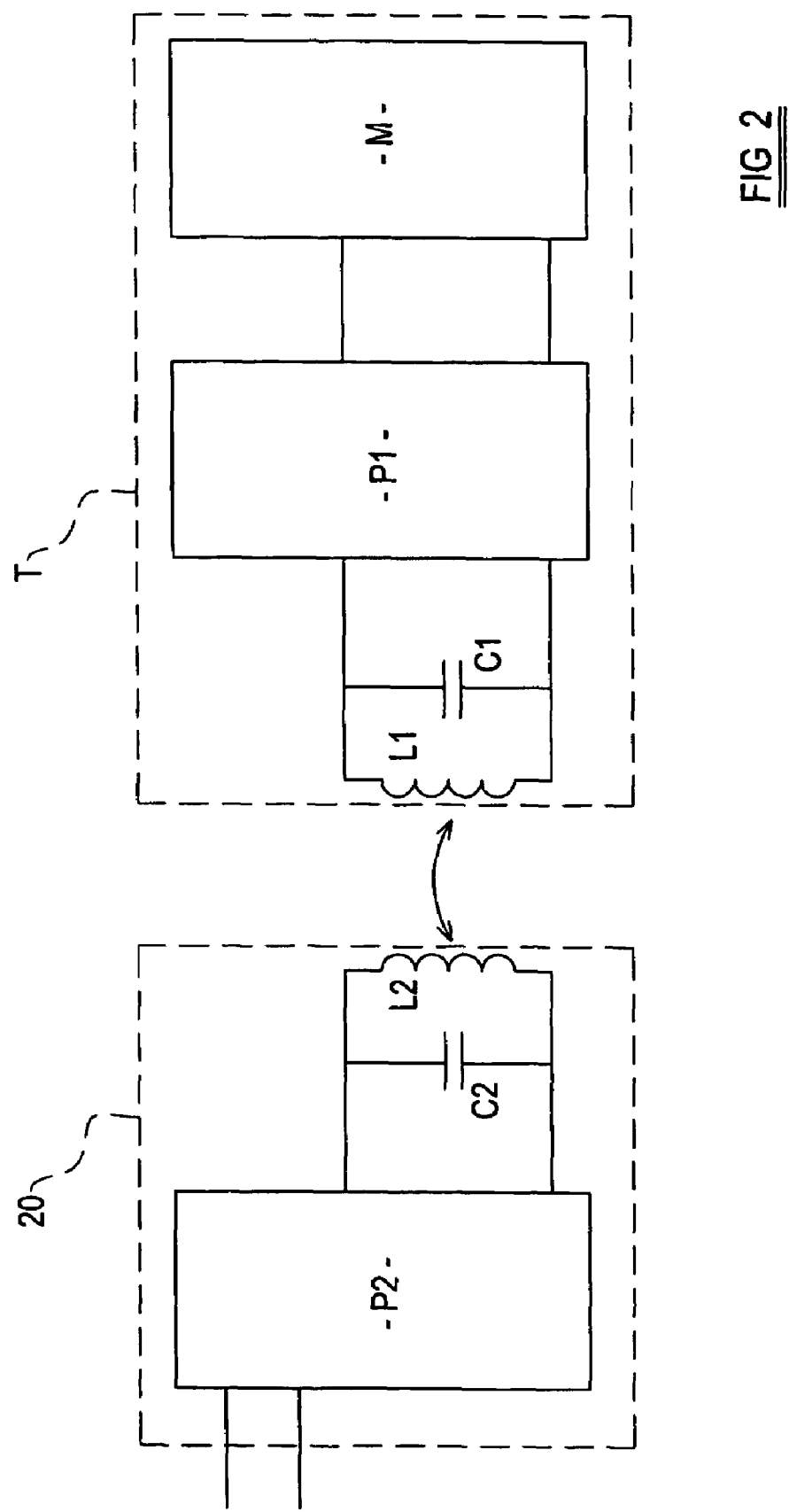
FIG. 2 schematically illustrates a memory tag, as used in the invention, and read/write device.

In order to explain the invention, and how it may be used in practice, more fully the operation of memory tags T and an associated read/write device 20 will now be described briefly with reference to FIG. 2. A memory tag T includes an antenna coil L1 and a capacitor C1 connected in parallel therewith to form a resonant circuit. It further includes a memory M and processing and power circuit P1. The read/write device 20 includes an antenna coil L2 and a capacitor C2 in parallel therewith to form a resonant circuit, and a processing and signal generating circuit P2.

A signal generator within P2 generates a signal at the chosen frequency of operation, such as 2.45 GHz, and this is applied to the antenna coil L2 and thus generates an electromagnetic field which, provided the memory tag T is sufficiently close to the read/write device 20, penetrates the antenna coil L1 of the memory tag T. By induction a voltage is thus generated in the antenna coil L1, this is rectified in circuit P1 and used to power the memory tag T. The capacitance of the capacitors C1 and C2 is selected such that the resonant circuits are both resonant at the frequency generated by the signal generator, in order to maximise transmitted signal strength and received signal.

When data is to be written to the memory tag T by the read/write device 20 the radio frequency signal generated in P2 is modulated, e.g. amplitude modulated, with the data before being applied to the antenna coil L2 and transmitted. The signal received by the memory tag T by inductive coupling thus both powers the memory tag T and communicates with it, the circuit P1 separating the data signal from the carrier and passing data for storage to the memory M.

Similarly, if data is to be read from the memory tag T the circuit P1 applies a signal indicative of the data to the antenna coil L1 which is detected, as a result of the inductive coupling, by antenna coil L2 and deciphered in circuit P2 before being passed from the read/write device 20 to a main processor or alternative storage device (not shown). This signal may for example be transmitted using load modulation. In RFID systems such as this the power consumed by the memory tag T can be measured as a drop in voltage across the internal resistance of the antenna coil L2 of the read/write device 20. A load resistance within the circuit P1 may be switched on and off, thus altering the power consumed by the memory tag T which is then detected as an amplitude modulation of the voltage across the antenna coil L2 of the read/write device 20.

For more detail concerning the operation of RFID tags the reader is referred to the RFID Handbook, Klaus Finkenzeller, 1999, John Wiley & Sons.

Thus it will be understood that communication with the memory tags T is via a read/write device 20. Read/write devices 20 can take many forms but may be hand held pen type devices which are connected to a computer, or may be incorporated into other equipment such as a printer. Examples are discussed below.

Figure 3:
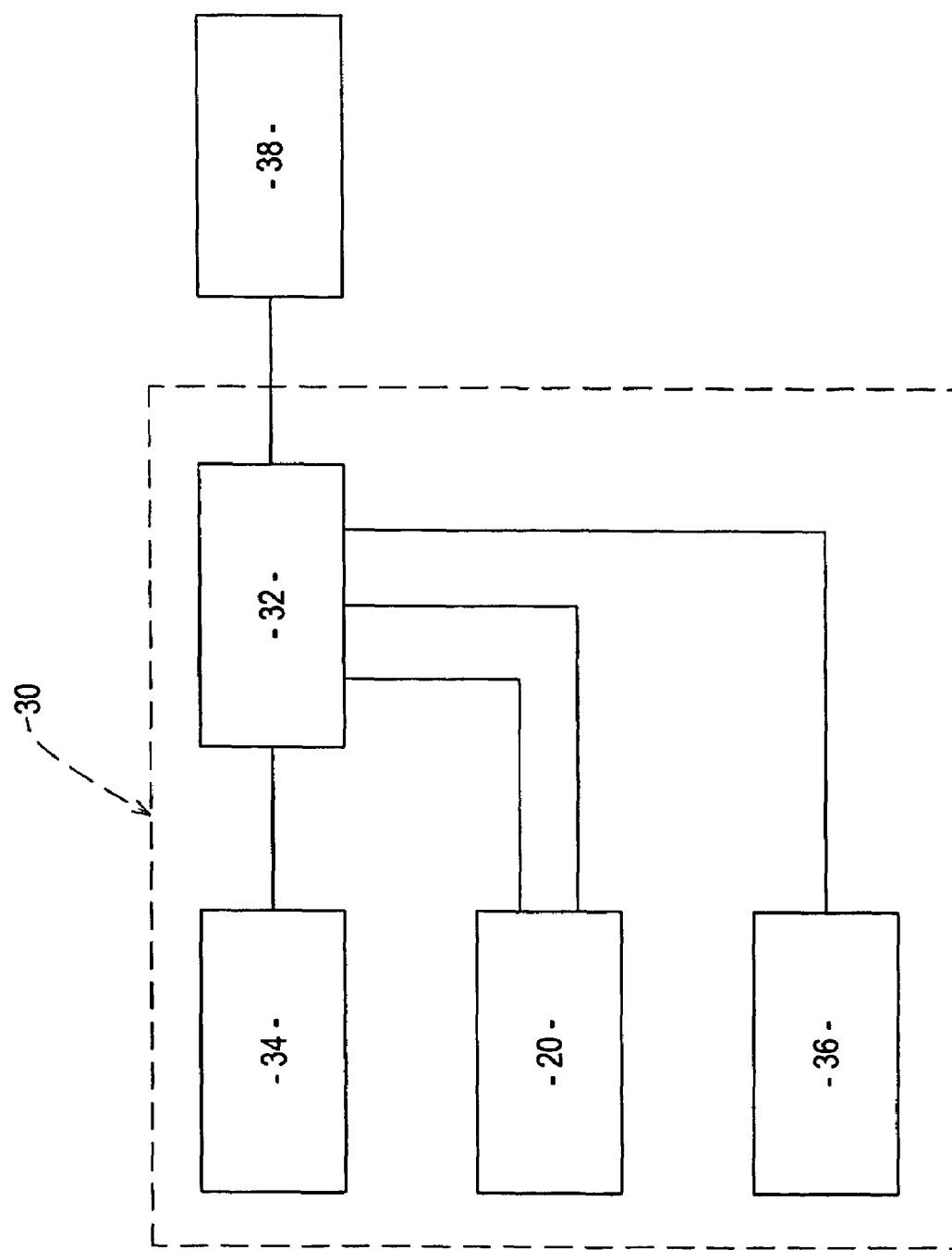
FIG. 3 schematically illustrates a printer and tag reader/writer as may be used to create a print according to the invention, and FIG. 4 schematically illustrates a second embodiment of a print according to the invention.

A printer which is also provided with a memory tag read/write device 20, and can read or write to memory tags T previously attached to or embedded in paper passed through it, is described in EP-A-1422656. The printer will not be described in detail here, but is described very briefly with reference to FIG. 3.

A printer 30 comprises a main processor 32, a print head 34, a read/write device 20 and a mechanics controller 36, which controls the movement of the print head 34 and read/write device 20 and other components such as paper feed rollers (not shown). The printer 30 is connected to a computer 38. The printer 30 receives print instructions from the computer 38 and the main processor 32 then issues instructions as necessary to the print head 34, the read/write device 20 and the mechanics controller 36 to implement the instructions from the computer 38. With such a printer 30 a print 10 may be produced very simply as follows.

Print medium 14 is fed into the printer 30 and instructions are issued by the computer 38 to print low resolution images $I_1$ to $I_{11}$ in image areas $A_1$ to $A_{11}$ of the substrate 12, and to write high resolution image data for images $I_1$ to $I_{11}$ to memory tags $T_1$ to $T_{11}$. The printer 30 may be set up for a particular form of print medium 14, and thus know the locations of the memory tags T, or it may need to detect the locations of the memory tags T either before commencing printing or as it proceeds. The main processor 32 of the printer 30 then moves the print medium 14 through the printer 30, moves the print head 32 and read/write device 20 as necessary and instructs the print head 32 to print and the read/write device 20 to write as appropriate to achieve the desired aim.

Referring now to FIG. 4 an alternative form of print 40 is illustrated schematically. Similarly to the print 10 it comprises a plurality of images I on a substrate 42 which is nominally divided up into image areas A and a border B as illustrated by chain lines. Each area A can have an image I printed in it, and in this case areas $A_{1'}$ to $A_{4'}$, $A_{6'}$ to $A_{8'}$, $A_{10'}$ to $A_{12'}$ and $A_{14'}$ to $A_{16'}$ have images $I_{1'}$ to $I_{4'}$, $I_{6'}$ to $I_{8'}$, $I_{10'}$ to $I_{12'}$ and $I_{14'}$ to $I_{16'}$ respectively and areas $A_{5'}$, $A_{9'}$ and $A_{13'}$ do not have images and are left blank. The areas that contain images also each have within them a memory tag T. However these are not all located in the same place with respect to the area A in which they are located but rather with respect to the image I with which they are associated. That is they are all located bottom right of the respective image I, and thus their location within the area A depends on the orientation of the image I concerned, depending on whether the image I is in portrait or landscape format.

In this embodiment those areas without an image do not contain a memory tag T. However, it should be understood that images may be printed into areas A without a memory tag T being applied to that to the respective area, if not required to store any data relating to the image concerned.

The substrate 42 and memory tags T combined from a print medium 44 with associated data storage, as described above in respective of print medium 14.

A printer which is also provided with a memory tag read/write device 20, and can read or write to memory tags T previously attached to or embedded in paper passed through it, and can also place memory tags onto paper passed through it, is described in EP-A-1422068. The printer operates in a very similar way to that described above with reference to FIG. 3 but with the additional feature that it can also write to memory tags and then place them on the paper, or place them on the paper and then write to them.

Such a printer and memory tag placer is suitable for production of a print 40 in which the location of the memory tags T is dependent upon the orientation of the image I with which it is associated. That is a plain sheet of paper would be fed into the printer and, during it's passage through the printer, would have printed onto it the various images, as well as having applied to it at appropriate locations memory tags T with the relevant data written to them.

A furthers modification to prints according to the invention is the provision of a memory tag $T_B$ located within the border of the substrate, as shown in FIG. 4. This memory tag $T_B$ would conveniently have stored in it data concerning the index print 40 as a whole, such as a list of the images I on the index print 40, and their respective locations on the print 40, including the locations of the memory tags T if appropriate.

Conveniently for all embodiments of prints according to the invention visible icons are printed at the location of each memory tag T such that users of the prints can readily locate the memory tags T when seeking to read the data from them. This will be particularly beneficial where the user is using a hand held reader rather than data being read by passing the print through a larger piece of equipment which in general would be able to scan for and thus detect the memory tags T before reading the data as required.

Clearly, other forms of print according to the invention may be formed with variations in the relative positions of the printed images I and the memory tags T, and with variations in the form of data stored in the memory tags T. As indicated above, different types of memory tag may also be employed.

The invention claimed is:

1. An index print, comprising:
   a substrate;
   a plurality of index images printed with low resolution on the substrate; and
   a plurality of memory tags coupled to the substrate;
   wherein each memory tag has storage capacity to store a high resolution copy of an image;
   wherein at least one of the plurality of index images is associated with a memory tag, wherein the memory tag associated with at least one of the plurality of index images is configured to store a high resolution copy of the index image it is associated with; and
   wherein one of the plurality of memory tags is configured to store at least one of a list of index images, respective locations of the index images, and locations of the memory tags associated with at least one of the plurality of index images.

2. An index print according to claim 1, wherein the memory tag associated with at least one of the plurality of index images is further configured to store data related to the initial creation of the high resolution image or the index image.

3. An index print according to claim 1, wherein the memory tag associated with at least one of the plurality of index images is further configured to store data relating to the content of the high resolution image or the index image.

4. An index print according to claim 1, wherein the memory tag associated with at least one of the plurality of index images is located on the substrate adjacent to the respective index image.

5. An index print according to claim 1, wherein the substrate is divided into a plurality of index image areas, each of which has printed thereon a single index image and is provided with an associated memory tag.

6. An index print according to claim 5, wherein each memory tag associated with at least one of the plurality of index images is located in the same place in the respective index image area.

7. An index print according to claim 5, wherein each memory tag associated with at least one of the plurality of index images is located in the same place with respect to the respective index image.

8. An index print according to claim 1, wherein the index print includes an icon at the location of each memory tag.

9. An index print according to claim 1, wherein each of the plurality of memory tags is adapted to be inductively powered to transmit data stored thereon.

10. A print medium, comprising:
    a substrate with a printable surface; and
    a plurality of memory tags coupled thereto at locations spaced apart over the area of the substrate, wherein each memory tag has storage capacity to store a high resolution copy of an image;
    wherein the printable surface comprises a plurality of index images that are printed with low resolution and a memory tag is associated with at least one of the index images, wherein the memory tag associated with at least one of the index images is configured to store a high resolution copy of the index image it is associated with;

wherein one of the plurality of memory tags is configured to store at least one of a list of index images, respective locations of the index images, and locations of the memory tags associated with at least one of the plurality of index images.

11. A print medium as claimed in claim 10, wherein each memory tag is adapted to be inductively powered for receiving data to be written to it.

12. A print medium according to claim 10, wherein the substrate is divided into a plurality of index image areas and a memory tag is located in each index image area.

13. A print medium according to claim 12, wherein the index image areas form a regular grid and each memory tag is located in the same place with respect to the index image area in which it is located.

14. A print medium according to claim 12 wherein the index image areas form a regular grid and the memory tags are located in different locations within the index image areas.

15. A method of storing data concerning a plurality of index images on a print medium including a substrate and a plurality of memory tags coupled thereto at locations spaced apart over the area of the substrate, wherein each memory tag has storage capacity to store a high resolution copy of an index image, the method comprising the steps of:
  printing a plurality of index images onto the substrate, each index image adjacent to a memory tag, wherein the plurality of index images are printed with low resolution;
  for at least one of the index images, storing data associated with the respective index image in the memory tag adjacent to it, said data including the respective index image at high resolution;
  printing a border onto the substrate, said border being printed proximate to a memory tag that is configured to store at least one of a list of index images, respective locations of the index images, and locations of the memory tags associated with at least one of the plurality of index images.

16. A method of storing data concerning a plurality of images comprising the steps of:
  printing a plurality of visible index images onto a substrate, wherein the plurality of visible index images are printed with low resolution;
  applying a memory tag, comprising a passive electronic memory, to the substrate adjacent to at least one of the visible index images, wherein each memory tag has storage capacity to store a high resolution copy of an image;
  applying a memory tag adjacent to a border, wherein the memory tag adjacent to the border is configured to store at least one of a list of index images, respective locations of the index images, and locations of the memory tags associated with at least one of the plurality of visible index images; and
  for each visible index image adjacent to which a memory tag has been applied, storing data associated with the visible index image in the memory tag adjacent to it, said data including the respective visible index image at high resolution.

17. A method according to claim 16 wherein the memory tags are applied to the substrate before the data is stored in them.

18. A method according to claim 16 wherein the data is stored in the memory tags before they are applied to the substrate.

* * * * *